US012625447B2

(12) United States Patent
Bu et al.

(10) Patent No.: US 12,625,447 B2
(45) Date of Patent: May 12, 2026

(54) IMAGE FORMING DEVICE AND CONTROL METHOD THEREOF

(71) Applicant: Zhuhai Pantum Electronics Co., Ltd., Zhuhai (CN)

(72) Inventors: Fuwei Bu, Zhuhai (CN); Haifei Gong, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/950,137

(22) Filed: Nov. 17, 2024

(65) Prior Publication Data

US 2025/0189917 A1 Jun. 12, 2025

(30) Foreign Application Priority Data

Dec. 12, 2023 (CN) ......................... 202311711024.3
Jul. 15, 2024 (CN) ......................... 202410947445.4

(51) Int. Cl.
*G03G 15/00* (2006.01)
*G03G 15/02* (2006.01)
*G03G 21/06* (2006.01)

(52) U.S. Cl.
CPC ......... *G03G 15/5008* (2013.01); *G03G 15/02* (2013.01); *G03G 15/5012* (2013.01); *G03G 21/06* (2013.01)

(58) Field of Classification Search
None
See application file for complete search history.

(56) References Cited

U.S. PATENT DOCUMENTS

| | | | | |
|---|---|---|---|---|
| 2,297,691 | A * | 10/1942 | Carlson | G03G 9/08 399/314 |
| 5,781,832 | A * | 7/1998 | Inoue | G03G 21/0064 399/285 |
| 2006/0291875 | A1 | 12/2006 | Chikara | |
| 2008/0080885 | A1* | 4/2008 | Kidaka | G03G 15/0131 399/66 |
| 2008/0285993 | A1 | 11/2008 | Ishida | |

(Continued)

FOREIGN PATENT DOCUMENTS

| | | | |
|---|---|---|---|
| CN | 114967392 | A | 8/2022 |
| CN | 117850183 | A | 4/2024 |

(Continued)

*Primary Examiner* — Sevan A Aydin
(74) *Attorney, Agent, or Firm* — Anova Law Group, PLLC

(57) ABSTRACT

An image forming device includes: an image bearing member to rotate; a charging member to charge a surface of the image bearing member; a developing member located in a rotation direction of the image bearing member and in downstream of the charging member along the rotation direction, and configured to supply developer to the image bearing member; a driving unit to drive the image bearing member, the charging member and the developing member to rotate; and a control unit, configured to adjust a control timing for applying a voltage to the charging member and the developing member, and control an operating state of the driving unit according to a current state of the image forming device, to eliminate charges in an area on the image bearing member between a position of the charging member and a position of the developing member.

19 Claims, 5 Drawing Sheets

(56) References Cited

U.S. PATENT DOCUMENTS

| | | | | |
|---|---|---|---|---|
| 2011/0217075 | A1* | 9/2011 | Uehara | G03G 21/186<br>399/114 |
| 2017/0060061 | A1* | 3/2017 | Takeuchi | G03G 15/065 |
| 2019/0004453 | A1* | 1/2019 | Eto | G03G 15/0865 |
| 2020/0310275 | A1* | 10/2020 | Kanai | G03G 15/043 |
| 2022/0221808 | A1* | 7/2022 | Yamauchi | G03G 15/065 |
| 2022/0342348 | A1* | 10/2022 | Kim | G03G 15/0865 |
| 2022/0350273 | A1* | 11/2022 | Endo | G03G 15/5037 |
| 2022/0373961 | A1* | 11/2022 | Nogami | G03G 21/1633 |

FOREIGN PATENT DOCUMENTS

| | | | |
|---|---|---|---|
| JP | H07248705 | A | 9/1995 |
| JP | 2000105523 | A | 4/2000 |
| JP | 2008076792 | A | 4/2008 |
| JP | 2013003435 | A | 1/2013 |
| JP | 2023062315 | A | 5/2023 |

* cited by examiner

IMAGE FORMING DEVICE AND CONTROL METHOD THEREOF

CROSS-REFERENCE TO RELATED APPLICATION

This application claims the priority of Chinese Patent Application No. 202311711024.3, filed on Dec. 12, 2023, and the priority of Chinese Patent Application No. 202410947445.4, filed on Jul. 15, 2024, the contents of all of which are incorporated herein by reference in their entirety.

TECHNICAL FIELD

The present disclosure generally relates to the field of image forming technologies and, more particularly, relates to an image forming device and a control method thereof.

BACKGROUND

An image recording method used in an image forming device corresponds to an electrostatic imaging process. In the electrostatic imaging process, an image bearing member is charged by a charging element in the image forming device, such that the surface of the image bearing member is uniformly charged. And then the surface of the image bearing member is irradiated by an exposure element, to form an electrostatic latent image. In a developing element, toners are transported and attached to the electrostatic latent image by carriers in the developer (including the toners and the carriers), and a developed image is formed by applying a developing voltage. Then, a paper is overlapped with the developed image, and the developed image is transferred to the paper by the electrostatic voltage, and a recorded image is formed by a fixing process. However, during the imaging process, because of some special reasons, a paper jam may occur. In this case, the application of the charging voltage and the developing voltage will be stopped, resulting in a residual surface potential in the area of the surface of the image bearing member corresponding to a position between the charging element and the developing element. After the paper jam is processed and the normal imaging process is restored, the image forming device will continue the previous imaging process, which will cause the area with residual potential on the surface of the image bearing member to adsorb the carriers to develop the electrostatic latent image, thereby causing the carriers to be consumed unnecessarily and resulting in an imbalance in the developer concentration. Therefore, the image is contaminated.

SUMMARY

One aspect of the present disclosure provides an image forming device. The image forming device includes: an image bearing member, configured to rotate; a charging member, configured to charge a surface of the image bearing member by contacting the image bearing member; a developing member located in a rotation direction of the image bearing member and in downstream of the charging member along the rotation direction, and configured to supply developer to the image bearing member; a driving unit, configured to drive the image bearing member, the charging member and the developing member to rotate; and a control unit, configured to adjust a control timing for applying a voltage to the charging member and the developing member according to a current state of the image forming device, and to control an operating state of the driving unit, to eliminate charges in an area on the image bearing member between a position corresponding to the charging member and a position corresponding to the developing member.

Another aspect of the present disclosure provides a control method of an image forming device. The image forming device includes: an image bearing member, a charging member, a developing member, and a driving unit. The method includes: adjusting a control timing for applying a voltage to the charging member and the developing member according to a current state of the image forming device, and to control an operating state of the driving unit, to eliminate charges in an area on the image bearing member between a position corresponding to the charging member and a position corresponding to the developing member. The image bearing member is configured to rotate. The charging member is configured to charge the surface of the image bearing member by contacting the image bearing member. The developing member is located in a rotation direction of the image bearing member and in downstream of the charging member along the rotation direction, and the developing member is configured to supply the developer to the image bearing member. The driving unit is configured to drive the image bearing member, the charging member and the developing member to rotate.

Another aspect of the present disclosure provides a non-transitory computer-readable storage medium containing a computer program that, when being executed, causes one or more processors to: adjust a control timing for applying a voltage to a charging member and a developing member according to a current state of an image forming device, and control an operating state of a driving unit, to eliminate charges in an area on an image bearing member between a position corresponding to the charging member and a position corresponding to the developing member.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. The embodiments disclosed herein are exemplary only. Other applications, advantages, alternations, modifications, or equivalents to the disclosed embodiments are obvious to those skilled in the art and are intended to be encompassed within the scope of the present disclosure.

It should be noted that the terms used in the embodiments of the present disclosure are only for the purpose of describing specific embodiments, and are not intended to limit the scope of the present disclosure. As used in the embodiments of the present disclosure and the appended claims, the singular forms such as "a", "said" and "the" are also intended to include the plural forms unless the context clearly indicates otherwise.

It should be understood that the term "and/or" used in this specification is just for relationship description of related objects, indicating that there can be three kinds of relationships. For example, A and/or B, which can mean that A exists alone, A and B exist at the same time, and B exists alone. In addition, the character "/" in this specification generally indicates that the related objects are in an "or" relationship.

In the present disclosure, an image forming device is a device having at least one function related to image formation, and the functions related to image formation may include but are not limited to: printing function, scanning function, copying function, or fax function. For example, a single-function printer is an image forming device with only a printing function. A multi-function printer is an image forming device with printing, copying, scanning and/or faxing functions, and the number of paper boxes can be set selectively. A digital multi-function printer, is an image forming device based on the copying function, and has standard or optional printing, scanning, and faxing functions. The digital multi-function printer uses digital principles to output documents in the form of laser printing. Images and text can be edited as needed. The digital multi-function printer has a large-capacity paper tray, high memory, large hard disk, powerful network support, and multi-task parallel processing capabilities.

Figure 1:
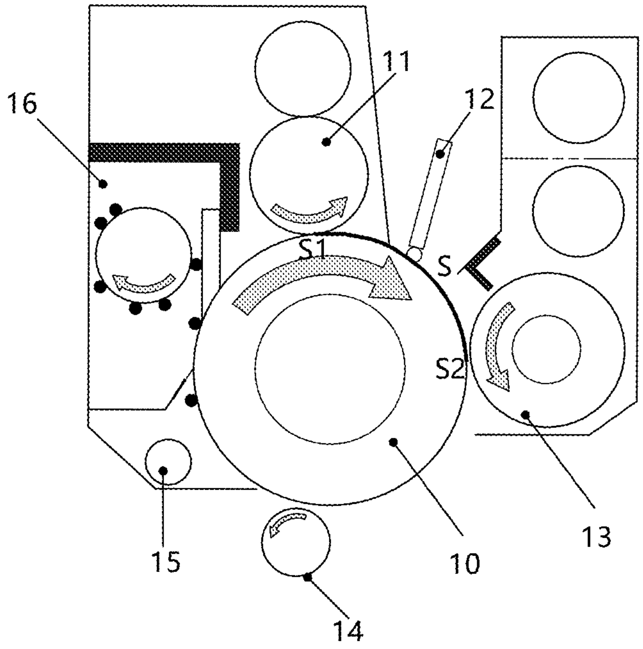
FIG. 1 illustrates a partial structure of an imaging component of an exemplary image forming device according to various disclosed embodiments of the present disclosure.

The present disclosure provides an image forming device. FIG. 1 shows a partial structure of an imaging component in an image forming device consistent with the present disclosure, the partial structure of the imaging component in the image forming device may include: an image bearing member, i.e., a photosensitive drum 10, a charging unit 11, an exposure unit 12, a developing unit 13, a transfer unit 14, a fixing unit (not shown), a de-electrification unit 15, and a cleaning unit 16. The charging unit 11 may include a charging member, such as a charging roller, which is used to charge the surface of the photosensitive drum 10 by contacting the photosensitive drum 10. The developing unit 13 may include a developing member, such as a developing roller, and a toner chamber. The roller surface of the developing roller may contact the developer in the toner chamber and supply the developer to the photosensitive drum during rotation. The developing unit 13 may be located in the rotation direction of the image bearing member 10 and located downstream of the charging unit 11 along the rotation direction of the image bearing member 10. Further, the developing member may be located in the rotation direction of the photosensitive drum and located downstream of the charging member along the rotation direction of the photosensitive drum. Exemplarily, when the photosensitive drum rotates in the clockwise direction, the position of the developing member may be located downstream of the position of the charging member corresponding to the clockwise rotation direction of the photosensitive drum. During the imaging process of the image forming device, a charging voltage may be applied to the charging roller by a charging voltage applying unit (not shown) to charge the photosensitive drum; the exposure unit 12 may expose the photosensitive drum to form an electrostatic latent image according to the image data to be printed, and the developing voltage applying unit (not shown) may apply a developing voltage to the developing unit 13. The electrostatic latent image may be developed by the developing unit 13 to form a developed image on the surface of the photosensitive drum; and the developed image may be then transferred to the paper by the transfer unit. The transfer unit here may be a single transfer unit or a transfer unit including a first transfer unit and a second transfer unit. Subseugently, the fixing unit may retain the image on the paper for a long time through high temperature and high pressure treatment. Further, the de-charge unit such as the de-charge lamp 15 may eliminate the charges remaining on the photosensitive drum 10 after the transfer, and clean the developer remaining on the photosensitive drum that has not been transferred through the cleaning unit 16. The developer may be divided into charged toners and charged carriers, and the toners and the carriers may have opposite charges. For the convenience of explaining the present disclosure, illustratively, the charged toners may be considered to be positively charged and the charged carriers may be considered to be negatively charged.

The image forming device may also include a voltage supply unit, a charging voltage applying unit and a developing voltage applying unit. The voltage supply unit may be configured to supply voltage to the charging voltage applying unit and the developing voltage applying unit. The charging voltage applying unit and the developing voltage applying unit may be two independent voltage applying units that do not interfere with each other. The charging voltage applying unit may be configured to apply a charging voltage to the charging member, and the developing voltage applying unit may be configured to apply a developing voltage to the developing member. The charging voltage applying unit and the developing voltage applying unit may also be an integrated voltage applying unit that is able to apply voltage to the charging member and the developing member simultaneously or in a time-sharing manner. The charging voltage applying unit and the developing voltage applying unit may be supplied with voltage by the same voltage source or by different voltage sources. Exemplarily, the charging voltage applying unit and the developing voltage applying unit may be supplied with voltage by the same voltage supply unit or by two voltage supply units. When the charging voltage applying unit and the developing voltage applying unit are supplied with voltage by the same voltage supply unit, the charging voltage applying unit and the developing voltage applying unit may be electrically connected to a voltage distribution unit, and the voltage distribution unit may be electrically connected to the voltage supply unit. The voltage distribution unit may be used to perform voltage application distribution control and voltage conversion according to the control timing of the charging member and the developing member. Alternatively, in another embodiment, the charging voltage applying unit and the developing voltage applying unit may be directly and electrically connected to the voltage supply unit, and the voltage supply unit may be also used to convert the voltage into voltages suitable for the charging voltage applying unit and the developing voltage applying unit, and to distribute the charging voltage supplied to the charging member and the developing voltage supplied to the developing member under the control of the control timing of the voltages applied by the charging member and the developing member. It should be noted that, in some embodiments, the image forming device may also have only one voltage supply unit which is electrically connected to the charging member and the developing member, and may directly supply voltage to the charging member and the developing member, without the need for the charging voltage applying unit and the developing voltage applying unit.

During the development process of the image forming device, voltages are applied to the charging roller and the developing roller respectively through the charging voltage applying unit and the developing voltage applying unit. When the photosensitive drum obtains the charged charges from the charging roller and rotates to the developing unit, a voltage drop is formed between the developing roller and the photosensitive drum. When the voltage drop meets the voltage drop required for normal development conditions, the positively charged toners are transported by the negatively charged carriers, such that the positively charged toners on the surface of the developing roller are adsorbed onto the electrostatic latent image on the surface of the photosensitive drum, thereby forming a developed image. However, when a paper jam occurs in the image forming device, the voltage supply to the photosensitive drum, the charging roller, and the developing roller is stopped. Therefore, there will be residual charges after charging by the charging roller in the position area S between the charging roller position S1 and the developing roller position S2 on the photosensitive drum surface. When a paper jam occurs in the image forming device, the voltage supply of the charging voltage applying unit is disconnected, resulting in a decrease in the voltage of the partial charge. When the paper jam is restored, the residual charge will first reach the developing roller position S2, but the developing roller has not been supplied with voltage at this time. In this way, the voltage drop formed between the developing roller and the photosensitive drum may not meet the voltage drop range under normal developing conditions, resulting in, for example, the electric field force formed by the charges between the developing roller and the photosensitive drum is much larger than the magnetic field force. Therefore, the charged carrier will be adsorbed on the photosensitive drum to form a developing image, resulting in unnecessary consumption of the carriers, and the developing image formed by the carriers will contaminate the actual required image. It should be noted that the carriers in the image forming device have only a limited number during the life cycle of the image forming device. Therefore, to ensure the life of the image forming device, it is necessary to reduce the consumption of the carriers.

Figure 2:
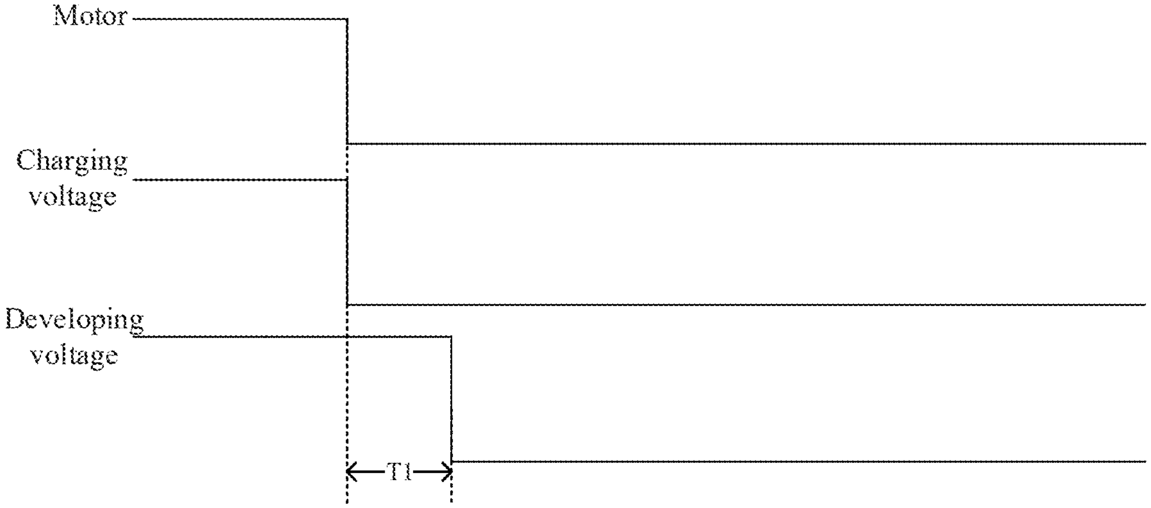
FIG. 2 illustrates a control timing diagram of a charging voltage, a developing voltage, and a motor of an exemplary image forming device according to various disclosed embodiments of the present disclosure.

As shown in FIG. 2 which is a timing diagram of the charging voltage, developing voltage, and motor control of an image forming device, during the normal imaging process of the image forming device, the control unit of the image forming device may control to first start the drive, such as the motor, such that it starts to rotate, and control the voltage supply unit to start applying voltage to the charging voltage applying unit for starting supplying power to the charging roller, and the charging roller may start to form a charging portion by contacting the photosensitive drum, and charge the surface of the photosensitive drum. After a predetermined time T1, the voltage supply unit may be controlled to start supplying power to the developing voltage applying unit, and to supply voltage to the developing roller. When a paper jam occurs in the image forming device, the area on the photosensitive drum surface corresponding to the area between the charging roller and the developing roller may retain the charges after being charged by the charging roller until it recovers to the normal state. Since the start supply time of the developing roller voltage is after the charging voltage and the motor are turned on for the predetermined time T1, when the area on the photosensitive drum surface corresponding to the area between the charging roller and the developing roller passes through the developing roller first, this area may first absorb the developing carriers for imaging due to the electric field relationship since the developing roller has not been supplied with voltage at this time, thereby consuming the developing carriers, and the developing image formed by the developing carriers may cause contamination of the actual image.

Figure 3A:
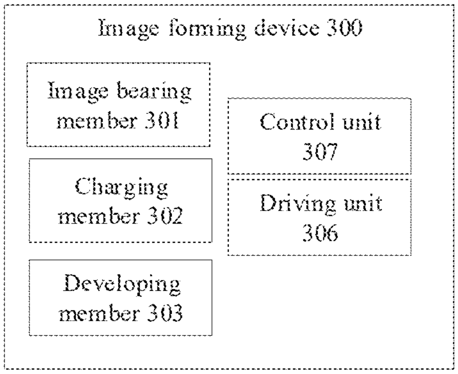
FIG. 3A illustrates a partial structure of an exemplary image forming device according to various disclosed embodiments of the present disclosure.
Figure 3B:
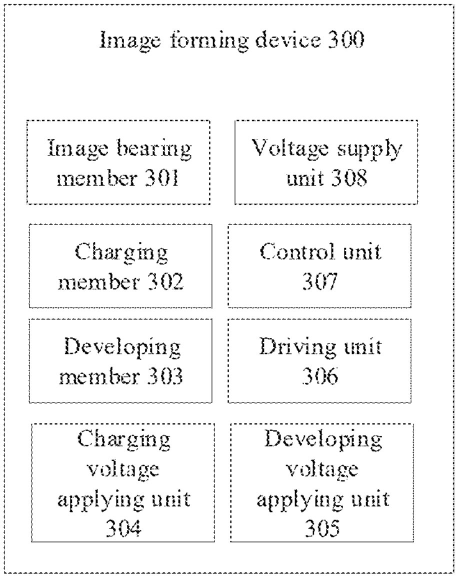
FIG. 3B illustrates a partial structure of another exemplary image forming device according to various disclosed embodiments of the present disclosure.

To at least partially alleviate the above problems, the present disclosure provides an image forming device. As shown in FIG. 3A which is a partial structure of an image forming device consistent with the present disclosure, in one embodiment, the image forming device 300 may include an image bearing member 301, a charging member 302, a developing member 303, a driving unit 306, and a control unit 307. The image bearing member 301 may be able to rotate; and the charging member 302 may be configured to charge the surface of the image bearing member 301 by contacting the image bearing member 301. The developing member 303 may be located in the rotation direction of the image bearing member 301 and downstream of the charging member 302 along the rotation direction of the image bearing member 301, and may be configured to supply developer to the image bearing member 301. The driving unit 306 may be configured to drive the image bearing member 301, the charging member 302, and the developing member 303 to rotate. The control unit 307 may be configured to adjust the control timing of applying voltage to the charging member 302 and the developing member 303 according to the current state of the image forming device 300, and control the operation state of the driving unit 306, to eliminate the charges of an area between the position of the charging member 302 and the position of the developing member 303 on the image bearing member 301 after the paper jam state. In one embodiment, the control unit 307 may adjust the control timing of applying voltage to the charging member 302 and the developing member 303 according to the current state of the image forming device 300, and control the operation state of the driving unit 306. When the image forming device 300 is in the paper jam state, the control unit 307 may control the start of supplying voltage to the developing member 303, control the stop of supplying voltage to the charging member 302, and control the operation of the driving unit 306. As shown in FIG. 3B, the image forming device 300 may further include a charging voltage applying unit 304, a developing voltage applying unit 305, and a voltage supply unit 308. The charging voltage applying unit 304 may be configured to apply a charging voltage to the charging member 301; the developing voltage applying unit 305 may be configured to apply a developing voltage to the developing member 303; and the control unit 307 may be also configured to control the timing of the voltage supply unit 308 supplying voltage to the charging voltage applying unit 304 and the developing voltage applying unit 305 according to the current state of the image forming device 300, and control the operating state of the driving unit 306, to eliminate the charges of the area corresponding to the position of the charging member 302 and the position of the developing member 303 on the image bearing member 301.

In one embodiment, when the control unit 307 adjusts the control timing of applying voltage to the charging member 302 and the developing member 303 according to the current state of the image forming apparatus 300, and controls the operation state of the driving unit 306 to eliminate the charges of the image bearing member 301 corresponding to the position of the charging member 302 and the position of the developing member 303, the control unit 307 may be configured to: when the image forming device 300 is in the paper jam state, control the voltage supply unit 308 to start supplying voltage to the developing voltage applying unit 304, control the voltage supply unit 308 to stop supplying voltage to the charging voltage applying unit 304, and control the driving unit 306 to operate to eliminate the charges of the image bearing member corresponding to the position of the charging member 302 and the position of the developing member 303.

The control unit 307 may control the voltage supply unit 308 to start supplying voltage to the developing voltage applying unit 305, and control the voltage supply unit 308 to stop supplying voltage after the first predetermined time. The control unit 307 may control the driving unit 306 to operate by controlling the driving unit to operate and stop the operation after a second predetermined time has passed.

In the present disclosure, the image forming device 300 may start supplying voltage to the developing voltage applying unit 305 by the control unit 307 when the image forming device 300 is in the paper jam state, and stop supplying voltage to the developing voltage applying unit 305 after the first predetermined time. The driving unit 306 may be controlled to operate and stop operating after the second predetermined time. In this way, when a paper jam occurs in the image forming device 300, the power supply voltage of the developing member 303 may be not stopped immediately, such that there is still a normal developing voltage drop between the developing member 303 and the image bearing member 301. Therefore, there may still be a normal electric field and magnetic field relationship between the developing member 303 and the image bearing member 301, such as the electric field is not much larger than the magnetic field. Since the electromagnetic field relationship is normal, the magnetic carriers may not be adsorbed to the surface of the image bearing member 301 to form a carrier image because the magnetic field is much smaller than the electric field resulting in the carriers being unable to be normally maintained due to the electric field being too strong. After the first predetermined time has passed, the supply of power voltage to the developing member 303 may be stopped, and the driving unit 306 may be stopped. This period of time may be sufficient to normally develop the residual charges in the area corresponding to the position of the charging member and the position of the developing member position on the image bearing member 301. Compared with the situation where the control unit 307 controls the voltage supply unit 308 to stop supplying voltage to the developing voltage applying unit 305 and the charging voltage applying unit 304 to apply voltage and controls the driving unit 306 to stop running after a paper jam occurs in the image forming device 300, the residual charges in the area corresponding to the position of the charging member 302 and the position of the developing member 303 on the image bearing member 301 may be eliminated. Since the power supply to the developing member 303 is stopped at the occurrence of a paper jam, abnormal consumption of the carriers induced by the toners that cannot be adsorbed in the developing part to perform normal development may be prevented, and the abnormal development forming a developed image that affects the actual image quality may be avoided.

In one embodiment, when the control unit 307 adjusts the control timing of applying voltage to the charging member 302 and the developing member 303 according to the current state of the image forming device 300, and controls the operating state of the driving unit 306, the control unit 307 may be further configured to: when the image forming device 300 recovers from the paper jam state to the normal state, control the voltage supply unit 308 to start supplying voltage to the developing voltage applying unit 305, and after a third predetermined time has passed since the voltage supply unit 308 started supplying voltage to the developing voltage applying unit 305, control the voltage supply unit 308 to start supplying voltage to the charging voltage applying unit 304, and control the driving unit 306 to operate.

In the image forming device 300 provided in the present disclosure, when recovering from the paper jam state to the normal state after the paper jam occurs, the control unit 307 may control the voltage supply unit 308 to start supplying voltage to the developing voltage applying unit 305, and, after a predetermined period has passed since the voltage supply unit 308 starts supplying voltage to the developing voltage applying unit 305, control the starting voltage supply to the charging voltage applying unit 304, and control the operation of the driving unit 306. In this way, for the charges in the area corresponding to the charging component 302 position and the developing component 303 position on the image bearing member 301, when they first pass through the developing part, compared with the existing technologies in which the developing voltage is not supplied at this time, since the developing voltage is supplied in time, the developing member 303 may normally supply the developer to the surface of the image bearing member 301, and supply the toners other than the carriers to the surface of the image bearing member 301. Therefore, the normal developing operation may be performed. The problems including appearance of the developing image to contaminate the actual image and unnecessary consumption of the carriers since the surface of the image bearing member 301 absorbs the carriers due to the electrical field force far larger than the magnetic field force and the electrical field of the residual charges when the area corresponding to the charging component 302 position and the developing component 303 position on the image bearing member 301 passes through the developing part, may be prevented.

In one embodiment, when the control unit 307 adjusts the control timing of applying voltage to the charging member 302 and the developing member 303 according to the current state of the image forming device 300, and controls the operating state of the driving unit 306, to eliminate the charges in the area on the image bearing member 301 corresponding to the position of the charging member 302 and the position of the developing member 303, the control unit 307 may be further configured to: when the image forming device 300 recovers from the paper jam state to the normal state, control the driving unit 306 to run in a direction opposite to the running direction before the paper jam occurs in the image forming device 300, and after the driving unit 306 runs for a fourth predetermined period, control the voltage supply unit 308 to start supplying voltage to the charging voltage applying unit 304 to eliminate the charge in the area on the image bearing member 301 corresponding to the position of the charging member 302 and the position of the developing member 303.

As shown in FIG. 1, the image bearing member 301 in the image forming apparatus 300, such as the photosensitive drum 10, may rotate in the clockwise direction, that is, before the paper jam occurs in the image forming device 300, the control unit 307 may control the driving unit 306 to operate, thereby driving the image bearing member 301 to rotate in the clockwise direction. For example, the control unit 307 may control the driving unit 306 to operate in the clockwise direction, thereby driving the image bearing member 301 to rotate in the clockwise direction. When the image forming device 300 recovers from the paper jam state to the normal state after the paper jam occurs, the control unit 307 may control the driving unit 306 to operate, thereby driving the image bearing member 301 to rotate in the counterclockwise direction. For example, the control unit 307 may control the driving unit 306 to operate in the counterclockwise direction, thereby driving the image bearing member 301 to rotate in the counterclockwise direction.

In the image forming device 300 provided in the present disclosure, when the image forming device 300 is restored from the paper jam state to the normal state after the paper jam occurs, the control unit 307 may control the image bearing member 301 to run in the opposite direction to the running direction before the paper jam occurs in the image forming device 300, and after the predetermined driving operation period, and the surface of the image bearing member 301 reversely rotates from the position corresponding to the developing member 303 to the position corresponding to the charging member 302, and the normal supply timing control of the voltage supply to the charging voltage applying unit 304 and the developing voltage applying unit 305 after the image forming device 300 is turned on may be started, that is, the charging voltage may be started to be supplied to the charging voltage applying unit 304, and after a period of time, the developing voltage may be started to be supplied to the developing voltage applying unit 305. In this way, the charges of the area corresponding to the position of the charging member 302 and the position of the developing member 303 on the image bearing member 301 may be first returned to the charging part corresponding to the charging member 302, and after being charged to the normal charging voltage, the normal developing operation may be performed at the developing part corresponding to the developing member 303. Therefore, the residual charges on the image bearing member 301 corresponding to the charging member 302 and the developing member 303 may not reach the developing part first and be abnormally developed due to paper jam, thereby avoiding consuming the carriers unnecessarily and forming the developed image that contaminate the actual image.

Figure 5:
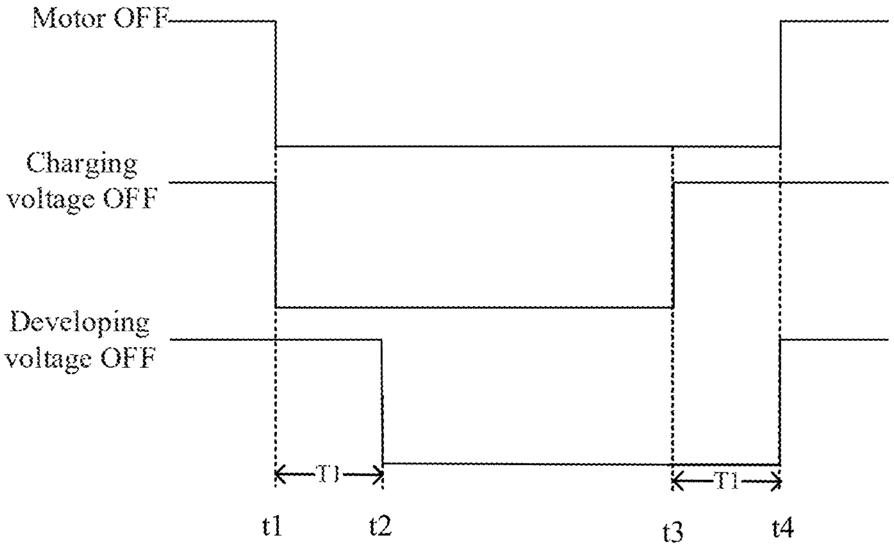
FIG. 5 illustrates a control timing diagram of a charging voltage, a developing voltage, and a motor of another exemplary image forming device according to various disclosed embodiments of the present disclosure.

In one embodiment, the first predetermined period and the second predetermined period may be the period required for the surface of the image bearing member 301 to rotate from the position corresponding to the charging member 302 to the position corresponding to the developing member 303. Or, the first predetermined period and the second predetermined period may be the time required for the image bearing member 301, the charging member 302 and the developing member 303 to stop rotating when the paper jam occurs in the image forming device 300, and may not exceed the period corresponding to the time difference between the time when the charging voltage applying unit 304 starts supplying voltage to the charging member 302 and the time when the developing voltage applying unit 305 starts supplying voltage to the developing member 303. As shown in FIG. 5, in one embodiment, the time corresponding to the time difference between the time when the charging voltage applying unit 304 starts to supply voltage to the charging member 302 and the time when the developing voltage applying unit 305 starts to supply voltage to the developing member 303 may be the period corresponding to the absolute time difference between the time when the charging voltage applying unit 304 controls the supply of voltage to provide a charging voltage to the charging member 302 (such as t1) and the time when the developing voltage applying unit 305 controls the supply of voltage to provide a developing voltage to the developing member 303 (such as t2) after the image forming device 300 is turned on, that is, |t1-t2|, i.e., T1.

In one embodiment, the third predetermined period may be the period required for the image bearing member 301 to rotate from the position corresponding to the charging member 302 to the position corresponding to the developing member 303. Or the third predetermined period may be the time corresponding to the time difference between the time when the charging voltage applying unit 304 starts to supply voltage to the charging member 302 and the time when the developing voltage applying unit 305 starts to supply voltage to the developing member 303. The period corresponding to the time difference between the time when the charging voltage applying unit 304 starts to supply voltage to the charging member 302 and the time when the developing voltage applying unit 305 starts to supply voltage to the developing member 303 may be as described above, and will not be repeated here. In one embodiment, the fourth predetermined period may be the time required for the image bearing member 301 to rotate from the position corresponding to the developing member 303 to the position corresponding to the charging member 302, or the fourth predetermined period may be the period corresponding to the time difference between the time when the charging voltage applying unit 304 starts to supply voltage to the charging member 302 and the time when the developing voltage applying unit 305 starts to supply voltage to the developing member 303. The period corresponding to the time difference between the time when the charging voltage applying unit 304 starts supplying voltage to the charging member 302 and the time when the developing voltage applying unit 305 starts supplying voltage to the developing member 303 may be as described above and will not be repeated here.

In one embodiment, the first predetermined period, the second predetermined period, the third predetermined period, and the fourth predetermined period may be the same or different. For example, the first predetermined period, the second predetermined period, the third predetermined period, and the fourth predetermined period may also be a period T1 that is a time delay of the developing voltage starting time relative to the starting time of the charging voltage and the motor. Further, it should be noted that the first predetermined period, the second predetermined period, the third predetermined period, and the fourth predetermined period may have different corresponding actual periods due to their respective states. Exemplarily, before the paper jam occurs, the driving unit 306 may run at a speed of V1, and correspondingly, the driving unit 306 may drive the image bearing member 301 to rotate at a speed of V3. When the paper jam occurs and after recovering from the paper jam state, the driving unit may run at a speed starting from V2 (V2<V1) until it reaches V1, and correspondingly, the driving unit 306 may drive the image bearing member 301 to rotate at a speed starting from V4 to V3 (V4<V3). After recovering from the paper jam state to the normal state, the period T3 required for the control unit 307 to control the driving unit 306 to run and to control the surface of the image bearing member 301 to rotate from the position corresponding to the charging member 302 to the position corresponding to the developing member 303 may be longer than the period T2 required for the control unit 307 to control the driving unit 306 to run and to control the surface of the image bearing member 301 to rotate from the position corresponding to the charging member 302 to the position corresponding to the developing member 303 (T3>T2).

In one embodiment, when the image forming device 300 is in the paper jam state, when the control unit 307 controls the supply of voltage to the developing voltage applying unit 305, the control unit 307 may be configured to: when the image forming device 300 is in the paper jam state, control the voltage supply unit 308 to supply the developing voltage applying unit 305 with a voltage that is the same as the voltage value before the image forming device 300 is in the paper jam state, or control the voltage supply unit 308 to supply the developing voltage applying unit 305 with a voltage value K1 that is different from the voltage value K before the image forming device 300 is jammed, and the voltage value K1∈[K−50, K+50].

In the image forming device provided by the present disclosure, the control unit may control to supply the voltage to the developing voltage applying unit when the image forming device recovers from the paper jam state to the normal state, that is, control to supply the voltage to the developing member, and the supplied voltage value K1 may be the same voltage value as the voltage value K before the paper jam occurs, that is, K1=K, or the provided voltage value K1 may belong to a predetermined range of the voltage value K before the paper jam occurs, such as K1∈[K−50,K+50]. In this way, by controlling the voltage value after the paper jam to have no significant change compared with the voltage value in the normal state before the paper jam, it may be ensured that the electric field relationship between the developing member and the image bearing member still meets the normal development conditions (for example, the voltage drop formed between the developing roller and the image bearing member belongs to the normal voltage drop range, the electric field force is not much greater than the magnetic field force, and the photosensitive drum surface adsorbs the toners for normal development) after the image forming device recovers from the paper jam state to the normal state. Therefore, the problems including that the electric field between the developing member and the image bearing member does not meet the normal development conditions, resulting in the carriers being adsorbed to the surface of the image bearing member to form an undesired development image that contaminates the actual desired image, and the carriers are consumed unnecessarily, may be prevented.

The present disclosure also provides a control method for an image forming device. The image forming device may include an image bearing member, a charging member, a developing member, and a driving unit. The image bearing member may be configured to rotate; and the charging member may be configured to charge the surface of the image bearing member by contacting the image bearing member. The developing member may be located in the rotation direction of the image bearing member and downstream of the charging member along the rotation direction, and may be configured to supply developer to the image bearing member. The driving unit may be configured to drive the image bearing member, the charging member, and the developing member to rotate. The method may include: according to the current state of the image forming device, adjusting the control timing of applying voltage to the charging member and the developing member, and controlling the operating state of the driving unit, to eliminate the charges at an area on the image bearing member corresponding to the position of the charging member and the position of the developing member.

In one embodiment, according to the current state of the image forming device, adjusting the control timing of applying the voltage to the charging member and the developing member and controlling the operating state of the driving unit, may include: when the image forming device is in the paper jam state, the control unit controlling the start of supplying voltage to the developing member, controlling the stop of supplying voltage to the charging member, and controlling the operation of the driving unit.

The image forming device may further include a charging voltage applying unit, a developing voltage applying unit, and a voltage supply unit. The charging voltage applying unit may be configured to apply a charging voltage to the charging member, the developing voltage applying unit may be configured to apply a developing voltage to the developing member, and the voltage supply unit may be configured to supply voltage to the charging voltage applying unit and the developing voltage applying unit. The method may further include: according to the current state of the image forming device, controlling the timing of the voltage supply unit supplying voltage to the charging voltage applying unit and the developing voltage applying unit, and controlling the operation state of the driving unit.

The present disclosure also provides another control method for an image forming device. The image forming device may include a photosensitive drum, a charging roller, a charging voltage applying unit, a developing roller, a developing voltage applying unit, a voltage supply unit and a motor. The charging roller may be configured to form a charging part by contacting the photosensitive drum and to charge the surface of the photosensitive drum at the charging part. The developing roller may be located in the rotation direction of the image bearing member and downstream of the charging member along the rotation direction, and may be configured to supply the developer to the photosensitive drum at the developing part facing the photosensitive drum. The charging voltage applying unit may be configured to apply a charging voltage to the charging roller; the developing voltage applying unit may be configured to apply a developing voltage to the developing roller; and the voltage supply unit may be configured to supply power to the charging voltage applying unit and the developing voltage applying unit. The motor may be configured to drive the photosensitive drum, the charging roller and the developing roller to rotate. The method may include: according to the current state of the image forming device, controlling the timing of the voltage supply unit supplying voltage to the charging voltage applying unit and the developing voltage applying unit, and controlling the state of the motor operation to eliminate the charges at an area on the image bearing member corresponding to the position of the charging member and the position of the developing member.

Figure 4:
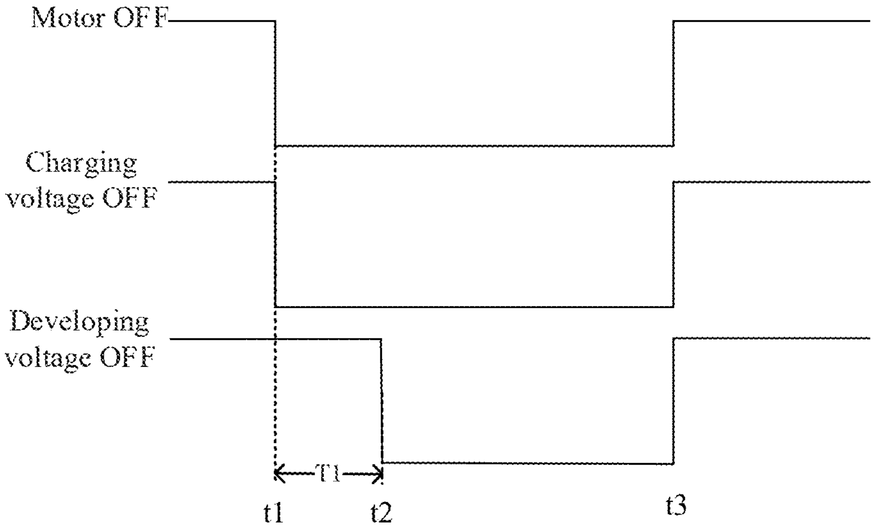
FIG. 4 illustrates a control timing diagram of a charging voltage, a developing voltage, and a motor of an image forming device in existing technologies.

As shown in FIG. 4 which is a schematic diagram of the control timing of the motor, charging voltage, and developing voltage of an image forming device in the existing technologies, after the image forming device is turned on, at time t1, the control unit controls the motor to start rotating, controls supplying voltage to the charging voltage applying unit, and provides the charging voltage to the charging roller to charge the photosensitive drum. After a period T1, at time t2, the power is supplied to the developing voltage applying unit, to provide the developing voltage, and provide the developer to the surface of the photosensitive drum. When the paper jam occurs in the image forming device, at time t3, the motor stops rotating, the supply of the charging voltage stops, and the supply of the developing voltage stops.

In one embodiment, when the image forming device is in the paper jam state, the voltage may be controlled to be supplied to the developing voltage applying unit, and the voltage supply may be stopped after a first predetermined time. The voltage supply to the charging voltage applying unit may be controlled to be stopped. The driving unit may be controlled to run and stop running after a second predetermined time.

As shown in FIG. 5 which is a schematic diagram of control timing of the motor, charging voltage, and developing voltage consistent with the present disclosure, in one embodiment, when the image forming device is in the paper jam state (at the time t3), the control unit of the image forming device may: control the voltage to be supplied to the developing voltage applying unit, and to stop the voltage supply at the time t4 after the first predetermined time; control the voltage supply to the charging voltage applying unit to be stopped; and control the motor to rotate, and stops rotating at the time t4 after the second predetermined time. The first predetermined time and the second predetermined time may be different from the time T1 or the same. Further, the first predetermined time and the second predetermined time may also be other identical times or different times. As long as the time is sufficient to eliminate the residual charges in the S area of the photosensitive drum surface.

In the control method of the image forming device provided by the present disclosure, when the paper jam occurs in the image forming device, the charging roller may stop charging the surface of the photosensitive drum, and may continue to supply power to the developing roller and continue the rotation of the motor, thereby driving the photosensitive drum and the developing roller to rotate normally for a period. The period may be exactly the time required for the S area of the photosensitive drum surface to rotate from the S1 position to the S2 position. In this way, compared with the existing technologies in which the image forming device stops supplying power to the charging roller and the developing roller and stops the rotation of the motor when the paper jam occurs, the problem that the residual charges on the S area of the photosensitive drum surface that has been charged by the charging roller cannot absorb the toners in the developing part to perform normal development since the power supply to the developing roller is stopped due to the paper jam, the carriers are abnormally consumed therefore, and the abnormal development forms a developed image that affects the actual image quality, may be prevented. In the present disclosure, after the image forming device jams, the power supply to the developing roller may be not stopped immediately, such that there is still a normal developing voltage drop between the developing roller and the photosensitive drum, and there is a normal electric field and magnetic field relationship between the developing roller and the photosensitive drum. Therefore, the electric field may not be much larger than the magnetic field. Since the electrical field and the magnetic field relationship is normal, the magnetic carriers may not be adsorbed to the surface of the photosensitive drum to form a carrier image because the magnetic field is much smaller than the electric field, resulting in the electric field being too strong and the carrier cannot be normally maintained. After a period of time that is sufficient to complete the normal development of the residual charges in the S area, and the power supply to the developing roller may be stopped and the rotation of the motor may be stopped.

In one embodiment, when the image forming device recovers from the paper jam state to the normal state, the voltage supply unit may be controlled to start supplying voltage to the developing voltage applying unit, and after a third predetermined time has passed since the voltage supply unit started supplying voltage to the developing voltage applying unit, the voltage supply unit may be controlled to start supplying voltage to the charging voltage applying unit. The third predetermined period may be the same as or different from the period T1, and the third predetermined period may also be other time, as long as the period is sufficient to eliminate the residual charge in the area S of the photosensitive drum surface.

In one embodiment, when the image forming device recovers from the paper jam state to the normal state, the voltage supply unit may be controlled to start supplying voltage to the developing voltage applying unit, and, after a third predetermined period has passed since the voltage supply unit starts to supply voltage to the developing voltage applying unit, the voltage supply unit may be controlled to start supplying voltage to the charging voltage applying unit. The third predetermined period may be the same as or different from the period T1, or the third predetermined time may also be other period, as long as the period is sufficient to eliminate the residual charges in the area S of the photosensitive drum surface.

Figure 6:
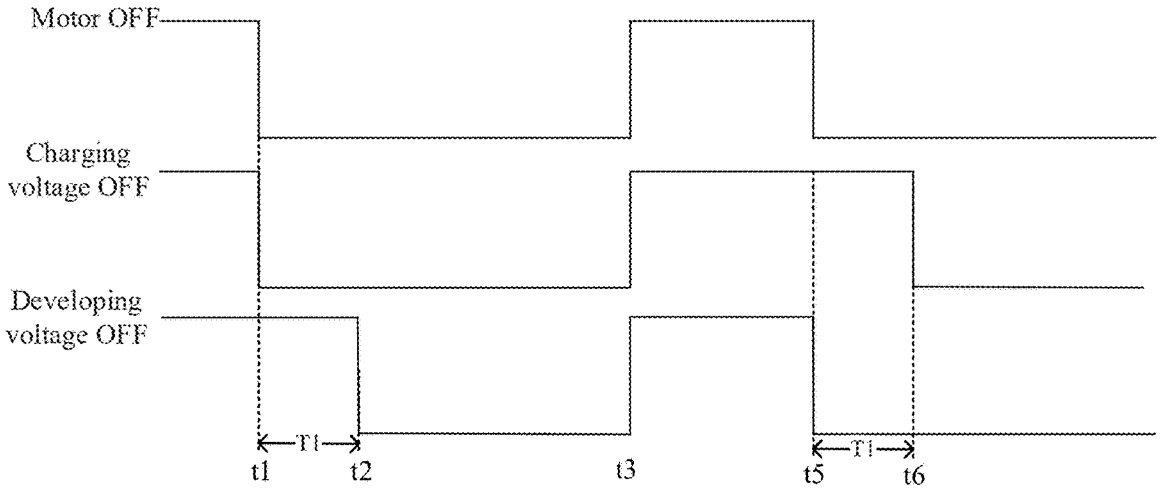
FIG. 6 illustrates a control timing diagram of a charging voltage, a developing voltage, and a motor of another exemplary image forming device according to various disclosed embodiments of the present disclosure.

As shown in FIG. 6, which is a schematic diagram of the control timing of the motor, charging voltage, and developing voltage, consistent with the present disclosure, when the image forming device recovers from the paper jam state (at t3) to the normal state (at t5), the control unit in the image forming device may control to first supply the developing voltage and control the motor to rotate first, and, after a third predetermined period, such as T1, at the time t6, the charging voltage may be supplied again.

Correspondingly, for the charges remaining in the S area of the photosensitive drum surface before the image forming device jams, when it first passes through the developing part, compared with the existing technology in which the developing voltage is not supplied at this time, since the developing voltage is supplied in time, the developing roller may normally supply the developer to the photosensitive drum surface, and supply the toners other than the carriers to the photosensitive drum surface. In this way, the normal developing operation may be performed. The problem that the residual charges on the S area of the photosensitive drum surface that has been charged by the charging roller cannot absorb the toners in the developing part to perform normal development since the power supply to the developing roller is stopped due to the paper jam, the carriers are abnormally consumed therefore, and the abnormal development forms a developed image that affects the actual image quality, may be prevented.

In one embodiment, when the image forming device recovers from the paper jam state to the normal state, the driving unit may be controlled to run in a direction opposite to the running direction of the image forming device before the paper jam occurs. And, after the driving unit runs for a fourth predetermined period, the driving unit may be controlled to run in the same direction as the running direction of the image forming device before the paper jam occurs, and the voltage may be controlled to be supplied to the charging voltage applying unit. The fourth predetermined period may be the same as or different from the period T1, and the fourth predetermined time may also be other period as long as the period is sufficient to eliminate the residual charges in the area S of the photosensitive drum surface.

Figure 7:
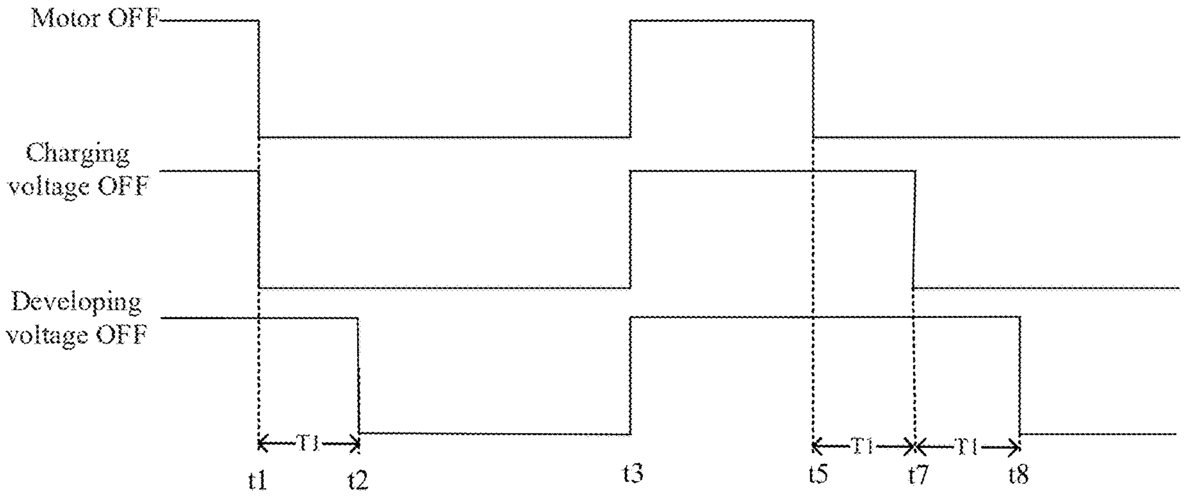
FIG. 7 illustrates a control timing diagram of a charging voltage, a developing voltage, and a motor of another exemplary image forming device according to various disclosed embodiments of the present disclosure.

As shown in FIG. 7 which is a schematic diagram of the control timing of the motor, charging voltage, and developing voltage control timing consistent with the present disclosure, when the image forming device recovers from the paper jam state (at t3) to a normal state (at t5), the control unit in the image forming device may control the motor to reverse for the fourth predetermined period. The fourth predetermined time may be the same as the period T1 or different from the period T1. The fourth predetermined period may be the period required for the motor to drive the surface position of the photosensitive drum corresponding to the developing roller position S2 to reverse from the corresponding developing roller position S2 to the corresponding charging roller position S1. Exemplarily, the fourth predetermined period may be regarded as the same as time T1, and after the fourth predetermined period T1, at the time t7, the charging voltage may be started to be supplied to the charging roller. After the fifth predetermined period, at the time t8, the developing voltage may start to be supplied to the developing roller. The fifth predetermined period may be the same as or different from the period T1, and is not specifically limited here. Preferably, the fifth predetermined period may be considered to be the same as the period T1, such that it may be ensured that the image forming device is still able to form images normally when it recovers from the paper jam state to the normal state and no other problems that may affect the image quality may occur even when a paper jam occurs during the imaging process.

In the control method of the image forming device provided by the present disclosure, the motor may be controlled to run in reverse for a period of time after the image forming device is jammed and when it is restored to the normal state from the jammed state, to reversely rotate the surface position of the photosensitive drum surface corresponding to the position of the developing roller from the position corresponding to the developing roller to the position corresponding to the charging roller position. Then, the normal supply timing control of the charging voltage and the developing voltage after the image forming device is turned on may be started. That is, the charging voltage may be supplied for a period of time, and then the developing voltage may start to be supplied after a period of time. In this way, the residual charges in the S area of the photosensitive drum surface may first return to the charging part, and after being charged to the normal charging voltage by the charging roller, the normal developing operation may be performed in the developing part. Therefore, the residual charges in the S area of the photosensitive drum surface may be prevented from first reaching the developing part due to the paper jam and being abnormally developed, the abnormal consumption of the carriers and a developed image that pollutes the actual image may be prevented.

In one embodiment, after the normal development operation is performed on the S area of the photosensitive drum surface through the above method, the S area of the photosensitive drum surface, regardless of whether the transfer operation is normally performed, may pass through the de-electrification unit to perform a de-electrification operation on the charges remaining on the surface of the photosensitive drum, and convert the charges into charges with a rated voltage. For example, the S area of the photosensitive drum surface may pass through the de-electrification unit, and the de-electrification unit may de-electrify the voltage carried by the surface charges to the rated voltage, such as −20V, thereby converting the residual charges of this part into the rated voltage value, such that the charges with the same voltage is normally charged through the charging part the next time. In this way, the residual charges of the S area of the photosensitive drum surface caused by paper jam may be processed to avoid carrier development in the developing part, consumption of the carrier, and formation of a developed image that pollutes the actual image.

Figure 8:
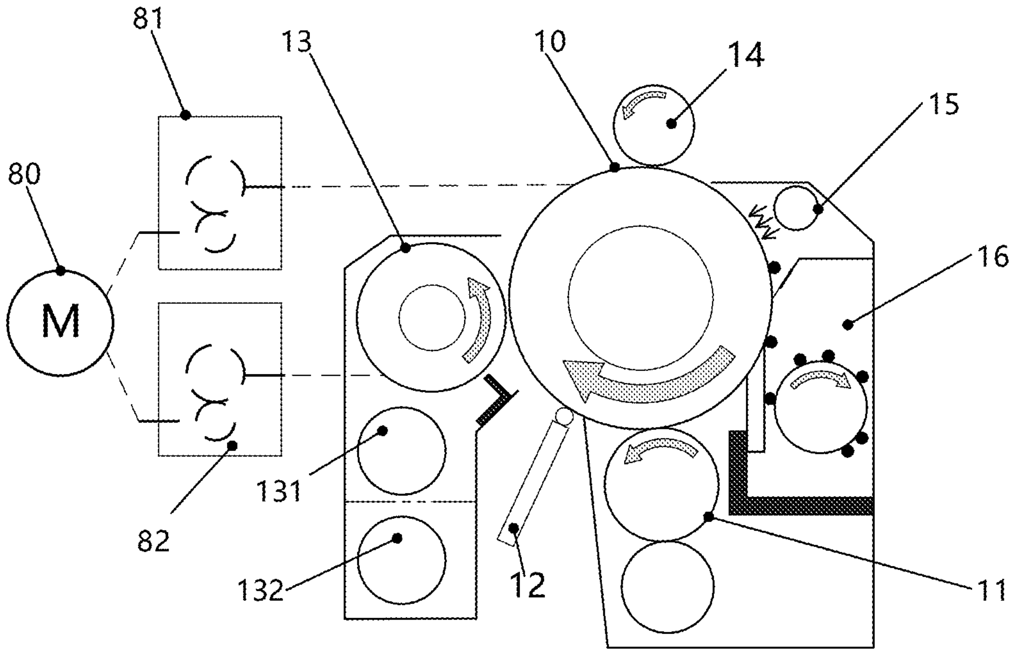
FIG. 8 illustrates a schematic diagram of driving control according to various disclosed embodiments of the present disclosure.

As shown in FIG. 8 which is a schematic diagram of a driving control provided by one embodiment of the present disclosure, with the image bearing member as described in FIG. 1, including the photosensitive drum 10, the charging unit 11, the exposure unit 12, the developing unit 13, the transfer unit 14, the fixing unit (not shown), the de-electrification unit 15, the cleaning unit 16, and also a drive, such as a motor 80, a transmission system 81, and a transmission system 82. The developing unit 13 may include a powder supply screw 131 which is configured to supply developer to the developing roller, and a stirring screw 132 which is configured to stir the developer in the developing unit 13. The transmission system 81 may control the operation of the image bearing member 10, for example, control the image bearing member 10 to rotate in a clockwise direction at a first predetermined speed. The transmission system 82 may control the operation of the developing unit 13, such as, control the stirring screw 132 in the developing unit 13 to start stirring, control the toner supply screw 131 to start supplying toners to the developing roller, and control the developing roller to start rotating in a counterclockwise direction at a second predetermined speed. The first predetermined speed may be different from the second predetermined speed. Preferably, the second predetermined speed may be faster than the first predetermined speed. When the second predetermined speed is faster than the first predetermined speed, even when the developing roller jumps during rotation, the toner supply screw may ensure that the developing roller supplies a relatively saturated developer concentration, thereby ensuring the quality of the developed image. This is because the surface of the developing roller is not actually completely smooth, and there may be small fluctuations. Therefore, when the developing roller rotates, there may be a situation of jumping. Because of the fluctuations on the surface of the developing roller, when the developer is supplied to the photosensitive drum for the hidden part, the concentration of the developer may be lower. Therefore, the developed image formed on the photosensitive drum may be lighter than the developed image formed by the normal developer concentration. However, when the speed of the developing roller is faster than that of the photosensitive drum, in the same time, the toner supply screw may supply a relatively saturated developer concentration to the developing roller, and the developing roller may supply a relatively saturated developer concentration to the photosensitive drum, thereby forming a normal developed image on the photosensitive drum. When the image forming device sends a command to the driver to start driving, the motor 80 may control the photosensitive drum to start rotating in the clockwise direction at the first predetermined speed by controlling the transmission system 81, and the charging roller in the charging unit may start rotating by generating friction with the photosensitive drum and rotate in the counterclockwise direction. At the same time, the motor 80 may control the developing roller to start rotating in the counterclockwise direction at the second predetermined speed by controlling the transmission system 82. In one possible embodiment, when the image forming device sends a command to the driver to start driving, the transmission system 81 and the transmission system 82 may be driven at the same time. Similarly, when the image forming device sends a command to the driver to stop driving, the motor 80 may control the photosensitive drum driven by the transmission system 81 to stop rotating by controlling the transmission system 81, and further stop the charging roller driven by the friction with the photosensitive drum. At the same time, the motor 80 may also control the developing roller driven by the transmission system 82 to stop rotating by the transmission system 82.

The present disclosure also provides a computer-readable storage medium. The storage medium may include a stored program. When the program is running, a device where the storage medium is located may be controlled to execute a control method of an image forming device provided by various embodiments of the present disclosure. For detailed description, the reference may be made to the above embodiments. The computer-readable storage medium may be a magnetic disk, an optical disk, a read only memory (ROM), or a random access memory (RAM), etc.

The embodiments disclosed herein are exemplary only. Other applications, advantages, alternations, modifications, or equivalents to the disclosed embodiments are obvious to those skilled in the art and are intended to be encompassed within the scope of the present disclosure. In some cases, the actions or steps recited in the present disclosure may be performed in an order different from that in the embodiments and still achieve desirable results. In addition, the processes depicted in the accompanying figures do not necessarily require the particular order shown, or sequential order, to achieve desirable results. Multitasking and parallel processing may be also possible or may be advantageous in certain embodiments.

Any process or method descriptions in flowcharts or otherwise described herein may be understood to represent modules, segments or portions of code comprising one or more executable instructions for implementing custom logical functions or steps of a process, and the scope of preferred embodiments of this specification includes alternative implementations in which functions may be performed out of the order shown or discussed, including in substantially simultaneous fashion or in reverse order depending on the functions involved.

In the present disclosure, the disclosed systems, devices or methods can be implemented in other ways. For example, the device embodiments described above are only illustrative. For example, the division of the units is only a logical function division. In actual implementation, there may be other division methods. For example, multiple units or components may be combined or may be integrated into another system, or some features may be ignored or not implemented. In another point, the mutual coupling or direct coupling or communication connection shown or discussed may be through some interfaces, and the indirect coupling or communication connection of devices or units may be in electrical, mechanical or other forms. Each functional unit in each embodiment of the present disclosure may be integrated into one processing unit, or each unit may exist separately physically, or two or more units may be integrated into one unit. The above-mentioned integrated units can be implemented in the form of hardware, or in the form of hardware plus software functional units.

The integrated units implemented in the form of software functional units may be stored in a non-transitory computer-readable storage medium. The above-mentioned software functional units may be stored in a storage medium, including several instructions to enable a computer device (which may be a personal computer, a connector, or a network device, etc.) or a processor to execute a portion of the methods described in each embodiment of the present disclosure. The aforementioned storage media may include medium that can store program code such as a flash disk, a mobile hard disk, read-only memory (ROM), random access memory (RAM), magnetic disk or optical disc, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An image forming device, comprising:

an image bearing member, configured to rotate;

a charging member, configured to charge a surface of the image bearing member by contacting the image bearing member;

a developing member located in a rotation direction of the image bearing member and in downstream of the charging member along the rotation direction, wherein the developing member is configured to supply developer to the image bearing member;

a driving unit, configured to drive the image bearing member, the charging member and the developing member to rotate; and a control unit, configured to adjust a control timing for applying a voltage to the charging member and the developing member, and control an operating state of the driving unit according to a current state of the image forming device, to eliminate charges in an area on the image bearing member between a position corresponding to the charging member and a position corresponding to the developing member, wherein according to the current state of the image forming device, while the control unit adjusts the control timing to stop applying the voltage to the charging member, the image bearing member is driven by the driving unit to rotate only across the area on the image bearing member between the position corresponding to the charging member and the position corresponding to the developing member.

2. The device according to claim 1, further including:

a charging voltage applying unit, configured to apply a charging voltage to the charging member;

a developing voltage applying unit, configured to apply a developing voltage to the developing member; and a voltage supply unit, configured to supply voltage to the charging voltage applying unit and the developing voltage applying unit, wherein:

the control unit is further configured to control the timing of the voltage supply unit supplying voltage to the charging voltage applying unit and the developing voltage applying unit, and to control the operating state of the driving unit, according to the current state of the image forming device.

3. The device according to claim 2, wherein:

when being configured to control the timing of the voltage supply unit supplying the voltage to the charging voltage applying unit and the developing voltage applying unit and control the operating state of the driving unit according to the current state of the image forming device, the control unit is configured to: when the image forming device is in a paper jam state, control the developing voltage applying unit to start supplying voltage, control the charging voltage applying unit to stop supplying voltage, and control the operation of the driving unit.

4. The device according to claim 3, wherein:

when being configured to control the developing voltage applying unit to start supplying voltage, the control unit is configured to control the developing voltage applying unit to start supplying voltage, and control the developing voltage applying unit to stop supplying voltage after a first predetermined period; and when being configured to control the operation of the driving unit, the control unit is configured to control the operation of the driving unit, and stop the operation of the driving unit after a second predetermined period.

5. The device according to claim 4, wherein:

the first predetermined period and the second predetermined period are a period required for the image bearing member to rotate from the position corresponding to the charging member to the position corresponding to the developing member; or the first predetermined period and the second predetermined period are longer than a period required for the image bearing member, the charging member and the developing member to stop rotating when a paper jam occurs in the image forming device, and are not longer than a time difference between a time when the charging voltage applying unit starts supplying voltage to the charging member and a time when the developing voltage applying unit starts supplying voltage.

6. The device according to claim 2, wherein:

when being configured to control the timing of the voltage supply unit supplying the voltage to the charging voltage applying unit and the developing voltage applying unit and control the operating state of the driving unit according to the current state of the image forming device, the control unit is further configured to: when the image forming device recovers from a paper jam state to a normal state, control the developing voltage applying unit to start supplying voltage; after a third predetermined period passed since the start of the developing voltage applying unit supplying voltage, control the charging voltage applying unit to start supplying voltage; and control the driving unit to operate.

7. The device according to claim 6, wherein:

the third predetermined period is a period required for the image bearing member to rotate from the position corresponding to the charging member to the position corresponding to the developing member, or the third predetermined period is a period corresponding to a time difference between a time when the charging voltage applying unit starts supplying voltage to the charging member and a time when the developing voltage applying unit starts supplying voltage to the developing member.

8. The device according to claim 2, wherein:

when being configured to control the timing of the voltage supply unit supplying the voltage to the charging voltage applying unit and the developing voltage applying unit according to the current state of the image forming device and control the operating state of the driving unit, the control unit is further configured to: when the image forming device recovers from a paper jam state to a normal state, control the driving unit to run in a direction opposite to a running direction of the image forming device before a paper jam occurs; and, after the driving unit runs for a fourth predetermined time, control the driving unit to run in a direction same as the running direction of the image forming device before the paper jam occurs; and control the charging voltage applying unit to start supplying voltage.

9. The device according to claim 8, wherein:

the fourth predetermined period is a period required for the image bearing member to rotate from the position corresponding to the developing member to the position corresponding to the charging member, or the fourth predetermined period is a period corresponding to a time difference between a time when the charging voltage applying unit starts supplying voltage to the charging member and a time when the developing voltage applying unit starts supplying voltage to the developing member.

10. A control method of an image forming device, the image forming device including an image bearing member, a charging member, a developing member, and a driving unit, the method comprising:

adjusting a control timing for applying a voltage to the charging member and the developing member according to a current state of the image forming device, and controlling an operating state of the driving unit, to eliminate charges in an area on the image bearing member between a position corresponding to the charging member and a position corresponding to the developing member, wherein:

the image bearing member is configured to rotate;

the charging member is configured to charge a surface of the image bearing member by contacting the image bearing member;

the developing member is located in a rotation direction of the image bearing member and in downstream of the charging member along the rotation direction, and the developing member is configured to supply developer to the image bearing member; and the driving unit is configured to drive the image bearing member, the charging member and the developing member to rotate, and wherein according to the current state of the image forming device, while the control unit adjusts the control timing to stop applying the voltage to the charging member, the image bearing member is driven by the driving unit to rotate only across the area on the image bearing member between the position corresponding to the charging member and the position corresponding to the developing member.

11. The method according to claim 10, wherein:

the image forming device further includes: a charging voltage applying unit configured to apply a charging voltage to the charging member; a developing voltage applying unit configured to apply a developing voltage to the developing member; and a voltage supply unit configured to supply voltage to the charging voltage applying unit and the developing voltage applying unit; and the method further includes: controlling the timing of the voltage supply unit supplying voltage to the charging voltage applying unit and the developing voltage applying unit, and controlling the operating state of the driving unit, according to the current state of the image forming device.

12. The method according to claim 11, wherein:

controlling the timing of the voltage supply unit supplying voltage to the charging voltage applying unit and the developing voltage applying unit, and controlling the operating state of the driving unit, according to the current state of the image forming device, includes: when the image forming device is in a paper jam state, controlling the developing voltage applying unit to start supplying voltage, and controlling the developing voltage applying unit to stop supplying voltage after a first predetermined period; controlling the charging voltage applying unit to stop supplying voltage; and controlling the operation of the driving unit, and stop the operation of the driving unit after a second predetermined period.

13. The method according to claim 11, wherein:

controlling the timing of the voltage supply unit supplying voltage to the charging voltage applying unit and the developing voltage applying unit, and controlling the operating state of the driving unit, according to the current state of the image forming device, includes:

when the image forming device recovers from a paper jam state to a normal state, controlling the developing voltage applying unit to start supplying voltage; after a third predetermined period passed since the start of the developing voltage applying unit supplying voltage, controlling the charging voltage applying unit to start supplying voltage; and controlling the driving unit to operate.

14. The method according to claim 11, wherein:

controlling the timing of the voltage supply unit supplying voltage to the charging voltage applying unit and the developing voltage applying unit, and controlling the operating state of the driving unit, according to the current state of the image forming device, includes:

when the image forming device recovers from a paper jam state to a normal state, controlling the driving unit to run in a direction opposite to a running direction of the image forming device before a paper jam occurs; and, after the driving unit runs for a fourth predetermined time, controlling the driving unit to run in a direction same as the running direction of the image forming device before the paper jam occurs; and controlling the charging voltage applying unit to start supplying voltage.

15. A non-transitory computer-readable storage medium containing a computer program that, when being executed, causes one or more processors to:

adjust a control timing for applying a voltage to a charging member and a developing member according to a current state of an image forming device, and to control an operating state of a driving unit, to eliminate charges in an area on an image bearing member between a position corresponding to the charging member and a position corresponding to the developing member, wherein according to the current state of the image forming device, while adjusting the control timing to stop applying the voltage to the charging member, the image bearing member is driven by the driving unit to rotate only across the area on the image bearing member between the position corresponding to the charging member and the position corresponding to the developing member.

16. The storage medium according to claim 15, wherein:

the image forming device further includes: a charging voltage applying unit configured to apply a charging voltage to the charging member; a developing voltage applying unit configured to apply a developing voltage to the developing member; and a voltage supply unit configured to supply voltage to the charging voltage applying unit and the developing voltage applying unit; and the one or more processors are further configured to: control the timing of the voltage supply unit supplying voltage to the charging voltage applying unit and the developing voltage applying unit, and control the operating state of the driving unit, according to the current state of the image forming device.

17. The storage medium according to claim 16, wherein:

when being configured to control the timing of the voltage supply unit supplying voltage to the charging voltage applying unit and the developing voltage applying unit, and control the operating state of the driving unit, according to the current state of the image forming device, the one or more processors are further configured to: when the image forming device is in a paper jam state, control the developing voltage applying unit to start supplying voltage, and control the developing voltage applying unit to stop supplying voltage after a first predetermined period; control the charging voltage applying unit to stop supplying voltage; and controlling the operation of the driving unit, and stop the operation of the driving unit after a second predetermined period.

18. The storage medium according to claim 16, wherein:

when being configured to control the timing of the voltage supply unit supplying voltage to the charging voltage applying unit and the developing voltage applying unit, and control the operating state of the driving unit, according to the current state of the image forming device, the one or more processors are further configured to:

when the image forming device recovers from a paper jam state to a normal state, control the developing voltage applying unit to start supplying voltage; after a third predetermined period passed since the start of the developing voltage applying unit supplying voltage, control the charging voltage applying unit to start supplying voltage; and control the driving unit to operate.

19. The storage medium according to claim 16, wherein:

when being configured to control the timing of the voltage supply unit supplying voltage to the charging voltage applying unit and the developing voltage applying unit, and control the operating state of the driving unit, according to the current state of the image forming device, the one or more processors are further configured to:

when the image forming device recovers from a paper jam state to a normal state, control the driving unit to run in a direction opposite to a running direction of the image forming device before a paper jam occurs; and, after the driving unit runs for a fourth predetermined time, control the driving unit to run in a direction same as the running direction of the image forming device before the paper jam occurs; and control the charging voltage applying unit to start supplying voltage.

* * * * *